United States Patent [19]

Biquez et al.

[11] Patent Number: 6,118,257

[45] Date of Patent: Sep. 12, 2000

[54] SWITCHGEAR FOR A POWER STATION GENERATOR AND A TRANSFORMER WITH A THREE-POSITION DISCONNECTOR

[75] Inventors: François Biquez, Brignais; Jean-Marc Willieme, La Mulatiere, both of France

[73] Assignee: GEC Alsthom T & D SA, Paris, France

[21] Appl. No.: 09/198,048

[22] Filed: Nov. 23, 1998

[30] Foreign Application Priority Data

Nov. 24, 1997 [FR] France ..................................... 97 14709

[51] Int. Cl.[7] ....................................................... H02P 9/02
[52] U.S. Cl. .................................. 322/12; 322/8; 361/20; 307/149
[58] Field of Search ......................... 322/8, 12; 307/149; 361/20

[56] References Cited

U.S. PATENT DOCUMENTS

| | | | |
|---|---|---|---|
| 4,214,289 | 7/1980 | Otsuku et al. ............................. | 361/20 |
| 4,360,849 | 11/1982 | Harris ........................................ | 361/39 |
| 4,612,495 | 9/1986 | Yamauchi et al. ....................... | 322/100 |
| 5,559,421 | 9/1996 | Miyakawa ................................. | 322/58 |
| 5,594,350 | 1/1997 | Koizumi et al. ......................... | 324/616 |
| 5,604,420 | 2/1997 | Nambu ..................................... | 322/19 |
| 5,701,089 | 12/1997 | Perkins .................................... | 324/772 |

*Primary Examiner*—Nicholas Ponomarenko
*Attorney, Agent, or Firm*—Sughrue, Mion, Zinn, Macpeak & Seas, PLLC

[57] ABSTRACT

The switchgear comprises a circuit breaker having an open position for isolating a generator from the network, and a closed position for connecting the generator to the network, together with a disconnector having a fixed pole connected to the generator and a contact connected to the fixed pole and movable relative thereto to occupy, when the circuit breaker is open, a first position connecting the generator to a starter circuit and a second position connecting the generator to ground. The moving contact of the disconnector also possesses a third position in which it forms an equipotential appendix for the fixed pole when the circuit breaker is closed. The moving contact does not carry the steady electric current of the generator, thus making it possible advantageously to reduce its dimensions so that they are capable merely of withstanding transient electrical conditions when in the first and third positions.

2 Claims, 1 Drawing Sheet

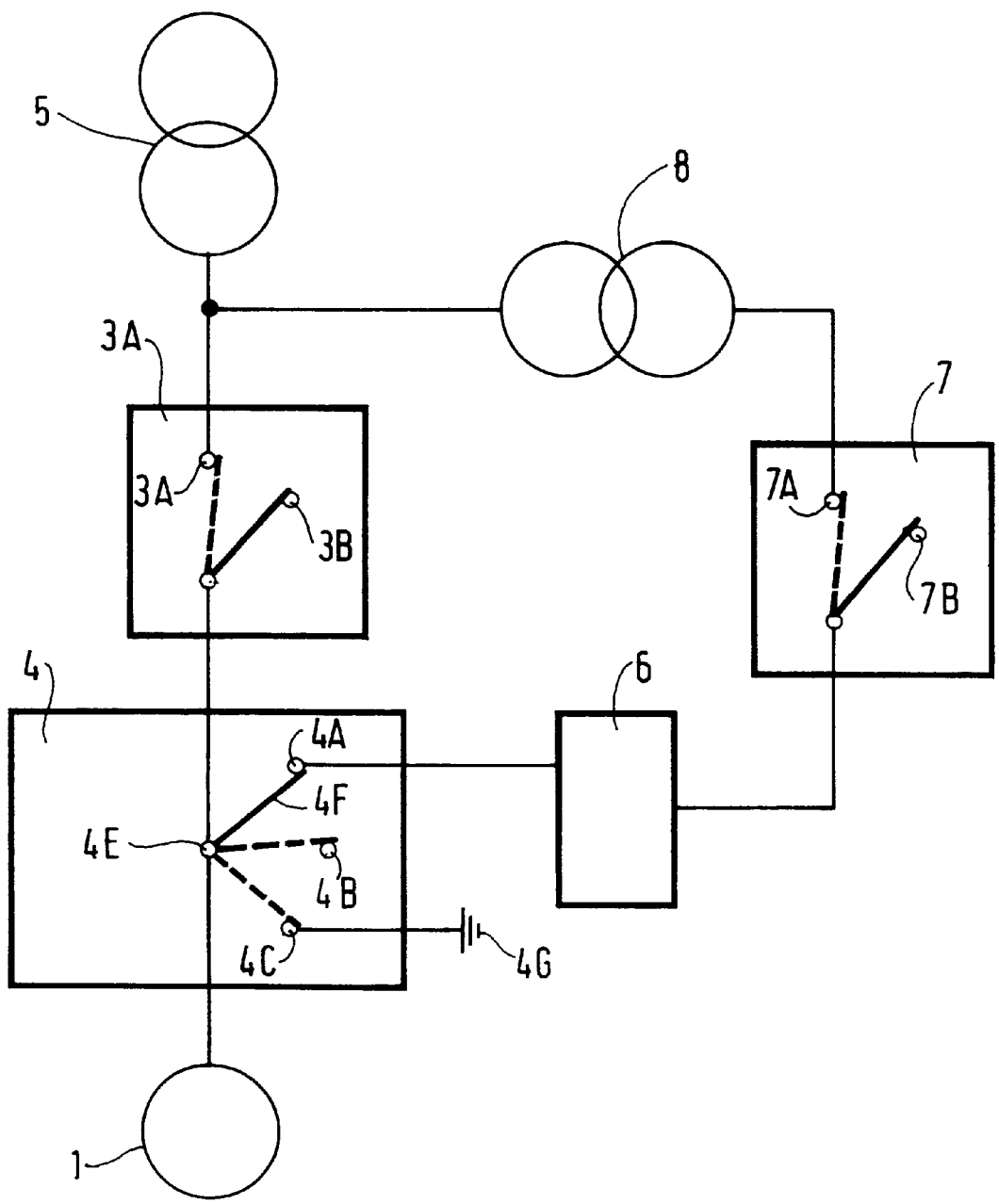

SWITCHGEAR FOR A POWER STATION GENERATOR AND A TRANSFORMER WITH A THREE-POSITION DISCONNECTOR

The present invention relates to switchgear between a power station generator and a transformer of a medium voltage or high voltage network. The switchgear comprises a circuit breaker having an open position for isolating the generator from the network, and a closed position for connecting the generator to the network, together with a disconnector having a fixed pole connected to the generator and a contact connected to the fixed pole and movable relative thereto to occupy, when the circuit breaker is open, a first position connecting the generator to a starter circuit and a second position connecting the generator to ground.

BACKGROUND OF THE INVENTION

Switchgear of that type is known in particular from European Patent Application EP A 0 567 773. The moving contact of the disconnector is organized to occupy a third position in which it connects the generator to the transformer via the fixed pole when the circuit breaker is closed. In the third position, the moving contact withstands electric current of a magnitude specific to the steady conditions of the generator, while, in the first and second positions, when the circuit breaker is open, the moving contact withstands electric current of a magnitude specific to the transient conditions of the generator during starting or during grounding. The moving contact is organized to withstand both types of electric current conditions, which means that the size and the cost of the moving contact are problematic.

OBJECTS AND SUMMARY OF THE INVENTION

An object of the invention is to optimize the size and the cost of the disconnector of the switchgear.

To this end, the invention provides switchgear between a power station generator and a transformer of a medium voltage or high voltage network, said switchgear comprising a circuit breaker having an open position for isolating the generator from the network, and a closed position for connecting the generator to the network, together with a disconnector having a fixed pole connected to the generator and a contact connected to the fixed pole and movable relative thereto to occupy, when the circuit breaker is open, a first position connecting the generator to a starter circuit and a second position connecting the generator to ground, wherein the moving contact of the disconnector also possesses a third position in which it forms a substantially equipotential appendix for the fixed pole of the disconnector when the circuit breaker is closed.

In the third position, the moving contact does not carry the steady electric current of the generator, thus making it possible to determine its shape and to select the material from which it is made as a function of the requirements of withstanding heating due merely to transient conditions of the generator. Hence, advantageously, the switchgear of the invention has a disconnector of small size and of low cost.

BRIEF DESCRIPTION OF THE DRAWING

Other characteristics and advantages of the invention appear on reading the following description of an embodiment of the invention given with reference to the drawing, in which:

the sole FIGURE is a block diagram of switchgear of the invention.

MORE DETAILED DESCRIPTION

As shown in the sole FIGURE, a power station generator 1 is connected to a transformer 5 of a medium voltage and high voltage network via switchgear which includes a circuit breaker 3. The power station generator is of the gas turbine type or of the combined gas and steam turbine type, and it includes sets of busbars, each of which is constituted by three conductors surrounded by three metal casings, into which respective ones of three phases of the generator circuit breaker are inserted. The circuit breaker has a closed position referenced 3A for connecting the generator to the network, and an open position referenced 3B for serving as a network circuit breaker, connected between the transformer and the medium voltage or high voltage network. Preferably, the circuit-breaker is of the generator circuit-breaker type, mounted between the generator and the transformer for mutually protecting these two elements in the event that either one of them is not operating properly. The circuit breaker is disposed in a metal casing filled with a dielectric gas under pressure.

A disconnector 4 is mounted between the generator 1 and the transformer 5, and preferably between the generator 1 and the circuit breaker 3 when said circuit breaker is of the generator circuit breaker type. A fixed pole 4E of the disconnector is connected to the generator and to a moving contact 4F which is displaced, when the circuit breaker is open in the position 3B, so as to occupy a first position referenced 4A connecting the generator to a starter circuit, or to occupy a second position referenced 4C connecting the generator to ground 4G.

The starter circuit is of a type known per se. It comprises, in series, a power supply transformer 8, a circuit breaker 7 having an open position 7B and a closed position 7A, and a variable-frequency static inverter 6 which makes it possible to drive the generator as a motor in order to start up the turbine. A compartment of the circuit breaker of the starter circuit is connected to the transformer, and a compartment of the variable-frequency static inverter is connected to the disconnector via the first position 4A of the moving contact 4F.

The grounding means 4G are also of known type.

According to the invention, the moving contact 4F also possesses a third position 4B in which it forms a substantially equipotential appendix for the fixed pole 4E of the disconnector 4 when the circuit breaker 3 is closed in position 3A. Under steady generator conditions, the switchgear transfers electric current to the transformer via the fixed pole 4E of the disconnector 4 and via the circuit-breaker 3. The moving contact 4F does not carry the steady current, thus making it possible to determine its shape and to choose the material from which it is made as a function of requirements for withstanding heating due merely to transient conditions of the generator. By way of example, the current is about 10,000 amps (A) under steady conditions. It is about 60,000 A for 1 second when the generator is grounded, and it is about 2,000 A for 15 minutes while the generator is starting. The moving contact, which is, for example, a knife contact, has a working section for withstanding transient conditions of about one half the size of the section required to withstand steady conditions. The switchgear of the invention thus makes it possible to reduce the working dimensions of the disconnector, and thus to reduce its cost.

When starting the generator, the circuit breaker 3 is opened into its position 3B, the moving contact 4F is displaced into its first position 4A for connecting the generator 1 to the starter circuit, and the power supply circuit breaker is closed into its position 7A. Once the turbine of the generator is capable of accelerating under its own power, the power supply circuit breaker is opened into its position 7B, the moving contact 4F is displaced into its third position 4B, and the circuit-breaker 3 is closed into its position 3A.

When performing maintenance on the generator 1, the circuit breaker 3 is opened into its position 3B, and the moving contact 4F is displaced into its second position 4C for connecting the generator 1 to ground 4G. Action can then be taken on the generator in a manner entirely safe from any risk of electrocution. It should be noted that, in the preferred embodiment in which the circuit breaker 3 is mounted between the generator 1 and the transformer 5, the transformer remains live, even once the generator has been grounded.

When performing maintenance on the circuit-breaker 3, in the preferred embodiment of the invention, the circuit breaker is opened into its position 3B, and the moving contact 4F is displaced into its second position 4B for connecting the generator 1 to ground 4G. Since the generator circuit breaker 3 is disposed between the disconnector and the transformer, the compartment of the circuit breaker that is connected to the fixed pole of the disconnector is grounded with the generator 1. The other compartment is grounded, e.g. by means of a movable grounding rod. Action in then taken on the circuit breaker in a manner entirely safe from any risk of electrocution.

What is claimed is:

1. Switchgear between a power station generator and a transformer of a medium voltage or high voltage network, said switchgear comprising a circuit breaker having an open position for isolating the generator from the network, and a closed position for connecting the generator to the network, together with a disconnector having a fixed pole connected to the generator and a contact connected to the fixed pole and movable relative thereto to occupy, when the circuit breaker is open, a first position connecting the generator to a starter circuit and a second position connecting the generator to ground, wherein the moving contact of the disconnector also possesses a third position in which it forms a substantially equipotential appendix for the fixed pole of the disconnector when the circuit breaker is closed.

2. Switchgear according to claim 1, in which the circuit breaker is a generator circuit breaker connected between the generator and the disconnector.

* * * * *